(12) United States Patent
Rigney et al.

(10) Patent No.: US 7,094,444 B2
(45) Date of Patent: Aug. 22, 2006

(54) METHOD FOR REPAIRING COATED COMPONENTS USING NIAL BOND COATS

(75) Inventors: Joseph D. Rigney, Milford, OH (US); Ching-Pang Lee, Cincinnati, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/714,430

(22) Filed: Nov. 13, 2003

(65) Prior Publication Data
US 2006/0029723 A1 Feb. 9, 2006

(51) Int. Cl.
B05C 13/00 (2006.01)
B05D 1/36 (2006.01)
(52) U.S. Cl. .......................... 427/142; 427/9; 427/402; 427/405
(58) Field of Classification Search .................... 427/8, 427/9, 140, 142, 307, 309, 402, 404, 405, 427/419.1; 29/889.1
See application file for complete search history.

(56) References Cited

U.S. PATENT DOCUMENTS

| | | | |
|---|---|---|---|
| 3,570,449 A | 3/1971 | Blecherman et al. | 118/712 |
| 5,813,118 A | 9/1998 | Roedl et al. | 29/889.1 |
| 5,851,409 A * | 12/1998 | Schaeffer et al. | 216/2 |
| 5,972,424 A * | 10/1999 | Draghi et al. | 427/142 |
| 6,042,880 A | 3/2000 | Rigney et al. | 427/142 |
| 6,049,978 A * | 4/2000 | Arnold | 29/889.1 |
| 6,153,313 A | 11/2000 | Rigney et al. | 428/632 |
| 6,174,448 B1 | 1/2001 | Das et al. | 216/2 |
| 6,210,488 B1 | 4/2001 | Bruce | 134/1 |
| 6,233,822 B1 | 5/2001 | Grossklaus, Jr. et al. | 29/889.1 |
| 6,238,743 B1 | 5/2001 | Brooks | 427/307 |

(Continued)

FOREIGN PATENT DOCUMENTS

EP 0 985 745 A1 3/2000

(Continued)

Primary Examiner—Timothy Meeks
Assistant Examiner—David Turocy
(74) Attorney, Agent, or Firm—Harrington & Smith, LLP

(57) ABSTRACT

According to an embodiment of the invention, a method for repairing a coated high pressure turbine blade, which has been exposed to engine operation, to restore coated airfoil contour dimensions of the blade, and improve upon the prior bond coat is disclosed. The method comprises providing an engine run high pressure turbine blade including a base metal substrate made of a nickel-based alloy and having thereon a thermal barrier coating system. The thermal barrier coating system comprises a diffusion bond coat on the base metal substrate and a top ceramic thermal barrier coating comprising a yttria stabilized zirconia material. The top ceramic thermal barrier coating has a nominal thickness t. The method further comprises removing the thermal barrier coating system, wherein a portion of the base metal substrate also is removed, and determining the thickness of the base metal substrate removed. The portion of the base metal substrate removed has a thickness, $\Delta t$. The method also comprises applying a $\beta$ phase NiAl overlay coating to the substrate, and determining the difference in thickness, $\Delta x$, between the $\beta$ phase NiAl overlay coating and the previously removed bond coat. The method further comprises reapplying the top ceramic thermal barrier coating to a nominal thickness of $t+\Delta t-\Delta x$, wherein $\Delta t$ compensates for the portion of removed base metal substrate. Advantageously, the coated airfoil contour dimensions of the high pressure turbine blade are restored to about the coated dimensions preceding the engine run.

25 Claims, 2 Drawing Sheets

U.S. PATENT DOCUMENTS

| | | | |
|---|---|---|---|
| 6,255,001 B1 | 7/2001 | Darolia | 428/610 |
| 6,258,226 B1 | 7/2001 | Conner | 204/279 |
| 6,291,084 B1 | 9/2001 | Darolia et al. | 428/633 |
| 6,305,077 B1 | 10/2001 | Conner et al. | 29/889.1 |
| 6,334,907 B1 | 1/2002 | Das et al. | 148/280 |
| 6,355,116 B1 | 3/2002 | Chen et al. | 148/280 |
| 6,379,749 B1 | 4/2002 | Zimmerman, Jr. et al. | 427/307 |
| 6,434,823 B1 | 8/2002 | Gupta et al. | 29/889.1 |
| 6,468,040 B1 | 10/2002 | Grylls et al. | 416/224 |
| 6,544,346 B1 | 4/2003 | Grossklaus, Jr. et al. | 134/29 |
| 6,575,702 B1 * | 6/2003 | Jackson et al. | 416/96 R |
| 6,586,115 B1 | 7/2003 | Rigney et al. | 428/633 |
| 6,599,416 B1 | 7/2003 | Kool et al. | 205/717 |
| 2002/0009611 A1 | 1/2002 | Darolia et al. | 428/680 |
| 2003/0021892 A1 | 1/2003 | Conner et al. | 427/142 |
| 2003/0035892 A1 | 2/2003 | Darolia et al. | 427/250 |
| 2003/0082297 A1 | 5/2003 | Wolkers et al. | 427/140 |

FOREIGN PATENT DOCUMENTS

| | | |
|---|---|---|
| EP | 0 992 612 A2 | 4/2000 |
| EP | 1 123 987 A1 | 8/2001 |
| EP | 1 254 967 A1 | 11/2002 |
| EP | 1 286 020 A2 | 2/2003 |
| EP | 1 416 063 A1 | 5/2004 |
| WO | WO 00/17490 | 3/2000 |

\* cited by examiner

METHOD FOR REPAIRING COATED COMPONENTS USING NIAL BOND COATS

CROSS-REFERENCE TO RELATED APPLICATION

The subject application shares certain attributes with U.S. Serial Nos. entitled, Method for Repairing Coated Components and Method for Repairing Components Using Environmental Bond Coatings and Resultant Repaired Components, respectively, filed concurrently herewith.

FIELD OF THE INVENTION

The invention generally relates to a method for repairing coated components exposed to high temperatures during, for example, gas turbine engine operation. More particularly, the invention relates to a method for removing and refurbishing a thermal barrier coating system that includes an inner metallic bond coat and an outer thermal insulating ceramic layer.

BACKGROUND OF THE INVENTION

Higher operating temperatures for gas turbine engines are continuously sought in order to increase efficiency. However, as operating temperatures increase, the high temperature durability of the components within the engine must correspondingly increase.

Significant advances in high temperature capabilities have been achieved through the formulation of nickel- and cobalt-based superalloys. For example, some gas turbine engine components may be made of high strength directionally solidified or single crystal nickel-based superalloys. These components are cast with specific external features to do useful work with the core engine flow and contain internal cooling details and through-holes to provide external film cooling to reduce airfoil temperatures. Nonetheless, when exposed to the demanding conditions of gas turbine engine operation, particularly in the turbine section, such alloys alone may be susceptible to damage by oxidation and corrosion attack and may not retain adequate mechanical properties. Thus, these components often are protected by an environmental coating or bond coat and a top thermal insulating coating often collectively referred to as a thermal barrier coating (TBC) system.

Diffusion coatings, such as aluminides and platinum aluminides applied by chemical vapor deposition processes, and overlay coatings such as MCrAlY alloys, where M is iron, cobalt and/or nickel, have been employed as environmental coatings for gas turbine engine components.

Ceramic materials, such as zirconia ($ZrO_2$) partially or fully stabilized by yttria ($Y_2O_3$), magnesia (MgO) or other oxides, are widely used as the topcoat of TBC systems. The ceramic layer is typically deposited by air plasma spraying (APS) or a physical vapor deposition (PVD) technique. TBC employed in the highest temperature regions of gas turbine engines is typically deposited by electron beam physical vapor deposition (EBPVD) techniques.

To be effective, the TBC topcoat must have low thermal conductivity, strongly adhere to the article and remain adherent throughout many heating and cooling cycles. The latter requirement is particularly demanding due to the different coefficients of thermal expansion between thermal barrier coating materials and superalloys typically used to form turbine engine components. TBC topcoat materials capable of satisfying the above requirements have generally required a bond coat, such as one or both of the above-noted diffusion aluminide and MCrAlY coatings. The aluminum content of a bond coat formed from these materials provides for the slow growth of a strong adherent continuous alumina layer (alumina scale) at elevated temperatures. This thermally grown oxide protects the bond coat from oxidation and hot corrosion, and chemically bonds the ceramic layer to the bond coat.

Though significant advances have been made with coating materials and processes for producing both the environmentally-resistant bond coat and the thermal insulating ceramic layer, there is the inevitable requirement to remove and replace the environmental coating and ceramic top layer under certain circumstances. For instance, removal may be necessitated by erosion or impact damage to the ceramic layer during engine operation, or by a requirement to repair certain features such as the tip length of a turbine blade. During engine operation, the components may experience loss of critical dimension due to squealer tip loss, TBC spallation and oxidation/corrosion degradation. The high temperature operation also may lead to growth of the environmental coatings.

Current state-of-the art repair methods often result in removal of the entire TBC system, i.e., both the ceramic layer and bond coat. One such method is to use abrasives in procedures such as grit blasting, vapor honing and glass bead peening, each of which is a slow, labor-intensive process that erodes the ceramic layer and bond coat, as well as the substrate surface beneath the coating. The ceramic layer and metallic bond coat also may be removed by a stripping process in which, for example, the part is soaked in a solution containing KOH to remove the ceramic layer and also soaked in acidic solutions, such as phosphoric/nitric solutions, to remove the metallic bond coat. Although stripping is effective, this process also may remove a portion of the base substrate thereby thinning the exterior wall of the part.

When components such as high pressure turbine blades are removed for a full repair, the ceramic and diffusion coatings may be removed from the external locations by stripping processes. The tip may then be restored, if needed, by weld build up followed by other shaping processes. The diffusion coatings and ceramic layer are then reapplied to the blades in the same thickness as if applied to a new component. However, airfoil and environmental coating dimensions/stability are particularly important for efficient engine operation and the ability for multiple repairs of the components. When design is limited to particular minimum airfoil dimensions, multiple repairs of such components may not be possible.

Moreover, while MCrAlY and diffusion bond coatings may be useful, scientists and engineers working under the direction of Applicants' Assignee are continually seeking new and improved bond coats and repair processes to further enhance engine operation efficiency and aid repairability of the components.

BRIEF DESCRIPTION OF THE INVENTION

Applicants have determined that if conventional processes are used in the afore-described repair, the original or pre-repair coated airfoil section dimensions are not restored and thus blade-to-blade throat distances (distance between adjacent airfoil sections in an engine) increase. Applicants also have determined that such changes in airfoil dimension may substantially affect turbine efficiency. Moreover, Applicants have determined that if a NiAl-based (stable and low interdiffusion) overlay bond coat also is employed in the repair process, further property advantages and improvements may be realized.

Accordingly, there exists a need for a method of repairing a coated gas turbine engine component, which compensates for the base metal loss as a result of coating removal processes, and improves upon the prior bond coat employed. There also is a need for a method of repairing a coated gas turbine engine component having an airfoil section, wherein the method compensates for the base metal loss as a result of coating removal processes and restores the airfoil section contour to its pre-repair or original coated airfoil contour dimensions, while also improving upon the prior bond coat employed. The present invention addresses these needs.

In one embodiment of the invention, a method for repairing a coated component, which has been exposed to engine operation, to restore coated dimensions of the component and increase subsequent engine operation efficiency, is disclosed. The method comprises providing an engine run component including a base metal substrate. The base metal substrate has thereon a thermal barrier coating system comprising a bond coat on the base metal substrate and a top ceramic thermal barrier coating. The top ceramic thermal barrier coating has a nominal thickness t. The method further comprises removing the thermal barrier coating system, wherein a portion of the base metal substrate also is removed, and determining the thickness of the removed base metal. The portion of the base metal substrate removed has a thickness, $\Delta t$. A β-phase NiAl overlay bond coat is applied to the substrate, and the difference in thickness, $\Delta x$, between the β phase NiAl overlay coating ($x_{NiAl}$) and the bond coat ($x_{Add}$) previously removed is determined (e.g. $\Delta x = x_{NiAl} - x_{add}$). The method further comprises reapplying a top ceramic thermal barrier coating to a nominal thickness of $t+\Delta t-\Delta x$, where $\Delta t$ compensates for the portion of removed base metal substrate. Advantageously, the dimensions of the coated component are restored to about the coated dimensions preceding the engine run to increase subsequent engine operation efficiency.

In another embodiment of the invention, a method for repairing a coated high pressure turbine blade, which has been exposed to engine operation, to restore coated airfoil contour dimensions of the blade, is disclosed. This method comprises providing an engine run high pressure turbine blade including a base metal substrate made of a nickel-based alloy and having thereon a thermal barrier coating system. The thermal barrier coating system comprises a diffusion bond coat on the base metal substrate and a top ceramic thermal barrier coating comprising a yttria stabilized zirconia material. The top ceramic thermal barrier coating has a nominal thickness t. The method further comprises removing the thermal barrier coating system, wherein a portion of the base metal substrate also is removed, and determining the thickness of the removed base metal. The portion of the base metal substrate removed has a thickness, $\Delta t$. A β-phase NiAl overlay bond coat is applied to the substrate, and the difference in additive layer thickness, $\Delta x$, between the β phase NiAl overlay coating and the bond coat previously removed is determined (e.g. $\Delta x = x_{NiAl} - X_{add}$). The method further comprises reapplying a top ceramic thermal barrier coating to a nominal thickness of $t+\Delta t-\Delta x$, where $\Delta t$ compensates for the portion of removed base metal substrate. Advantageously, the dimensions of the coated high pressure turbine blade are restored to about the coated dimensions preceding the engine run to increase subsequent engine operation efficiency.

Applicants have determined how to provide further temperature reductions for airfoils, which increases ceramic spallation life, which lowers subsequent coating growth to be experienced in the next repair cycle, and which also provides further alloy mechanical property advantages. This may be achieved through the addition of TBC ($\Delta t-\Delta x$).

Applicants have further determined that the NiAl-based overlay bond coats employed in embodiments of the invention achieve a number of advantages over, for example, PtAl diffusion coatings. These improvements include: about 2–4× greater TBC spallation resistance; TBC spall sizes less than about 0.25× that of PtAl diffusion bond coat test samples; about less than 0.5× coating growth into base metal, which enhances repairability; and oxidation resistance equivalent to or better than the PtAl diffusion coatings. Additionally, testing has shown that corrosion resistance may be equivalent to some PtAl diffusion coatings and the effects of the coating on base metal mechanical properties may be about the same or better than these PtAl diffusion coatings. The above property improvements make the NiAl-based overlay coatings employed in the invention attractive for repair applications.

Applicants also have determined how to compensate for base metal loss as a result of coating removal processes, and also restore airfoil section contour to its pre-repair or original coated airfoil contour dimensions, without a weight penalty. Thus, an important advantage of embodiments of the invention is that resulting airfoil throat area restoration will allow the turbine to run much more efficiently. For example, during conventional repair of an engine run component, about 3 mils of underlying base metal thickness may be removed in the process. Thus, about a 3 mil loss of base metal may be experienced on both the pressure and suction side of an airfoil, which translates into about a 6 mil increase in throat dimension (distance between adjacent airfoil sections in an engine). While this increase in gap between the components may not adversely affect the mechanical operation of the engine, Applicants have determined that operation efficiency may be substantially adversely affected. Embodiments of Applicants' invention present an innovative, much needed solution to the above problem, which is inexpensive to implement and does not require additional costly equipment. Moreover, replacement of the prior bond coat with the afore-referenced NiAl-based overlay bond coat provides even further property improvements for embodiments of the invention.

Other features and advantages will be apparent from the following more detailed description, taken in conjunction with the accompanying drawings, which illustrate by way of example the principles of the invention.

DETAILED DESCRIPTION OF THE INVENTION

The repair method of the present invention is generally applicable to components that operate within environments characterized by relatively high temperatures, and are therefore subjected to severe thermal stresses and thermal cycling. Notable examples of such components include the high and low pressure turbine nozzles and blades, shrouds, combustor liners and augmentor hardware of gas turbine engines. Other examples include airfoils, in general, and static parts such as vanes. One particular example is the high pressure turbine blade 10 shown in FIG. 1. For convenience, the method of the present invention will be described in the context of repairing blade 10. However, one skilled in the art will recognize that the method described below may be readily adapted to repairing any other gas turbine engine part coated with a thermal barrier coating system.

Figure 1:
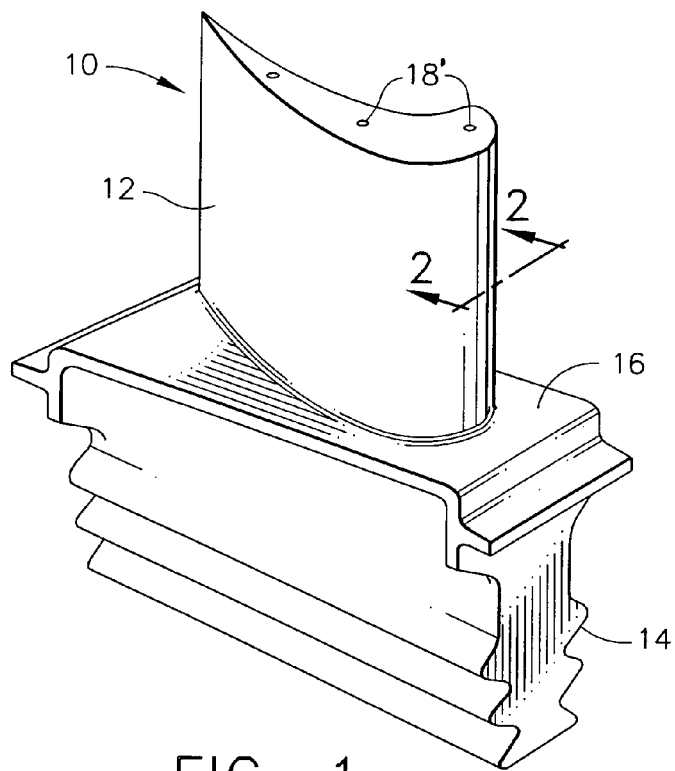
FIG. 1 is a perspective view of a high pressure turbine blade.

The blade 10 of FIG. 1 generally includes an airfoil 12 against which hot combustion gases are directed during operation of the gas turbine engine, and whose surface is therefore subject to severe attack by oxidation, corrosion and erosion. The airfoil 12 is anchored to a turbine disk (not show) with a dovetail 14 formed on a platform 16 of the blade 10. Cooling holes 18' are present in the airfoil 12 through which bleed air is forced to transfer heat from the blade 10.

The base metal of the blade 10 may be any suitable material, including a superalloy of Ni or Co, or combinations of Ni and Co. Preferably, the base metal is a directionally solidified or single crystal Ni-base superalloy. For example, the base metal may be made of Rene N5 material having a density of about 8.64 g/cm$^3$. The as cast thickness of the airfoil section 12 of blade 10 may vary based on design specifications and requirements.

Figure 2:
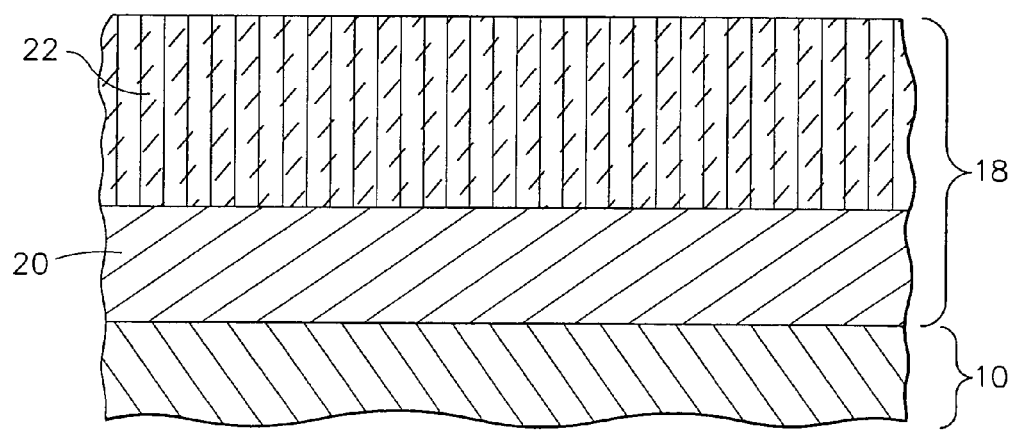
FIG. 2 is a local cross-sectional view of the blade of FIG. 1, along line 2—2 and shows a thermal barrier coating system on the blade.

The airfoil 12 and platform 16 may be coated with a thermal barrier coating system 18, shown in FIG. 2. The thermal barrier coating system may comprise a bond coat 20 disposed on the substrate of blade 10 and a ceramic thermal barrier coating 22 on top of the bond coat 20.

In an embodiment of the invention, the bond coat 20 is a diffusion coating and the base metal of the blade 10 is a directionally solidified or single crystal Ni-base superalloy. Both the Ni in a nickel-base superalloy and Co in a cobalt-base superalloy diffuse outward from the substrate to form diffusion aluminides, and the superalloys may include both Ni and Co in varying percentages. While the discussion of the superalloy substrate may be in terms of Ni-base superalloys, it will be understood that a Co-base superalloy substrate may be employed. Similarly, the bond coat 20 may comprise a MCrAlY coating alone or in combination with a diffusion coating, as well as other suitable known coatings.

According to an embodiment of the invention, the diffusion coating may comprise simple or modified aluminides, containing noble metals such as Pt, Rh or Pd and/or reactive elements including, but not limited to, Y, Zr and Hf. The diffusion coating may be formed on the component in a number of different ways. In brief, the substrate may be exposed to aluminum, such as by a pack process or a chemical vapor deposition (CVD) process at elevated temperatures, and the resulting aluminide coating formed as a result of diffusion.

More particularly, a nickel aluminide (NiAl) diffusion coating may be grown as an outer coat on a nickel-base superalloy by exposing the substrate to an aluminum rich environment at elevated temperatures. The aluminum from the outer layer diffuses into the substrate and combines with the nickel diffusing outward from the substrate to form an outer coating of NiAl. Because the formation of the coating is the result of a diffusion process, it will be recognized that there are chemical gradients of Al and Ni, as well as other elements. However, Al will have a high relative concentration at the outer surface of the article which will thermodynamically drive its diffusion into the substrate creating a diffusion zone extending into the original substrate, and this Al concentration will gradually decrease with increasing distance into the substrate. Conversely, Ni will have a higher concentration within the substrate and will diffuse into the thin layer of aluminum to form a nickel aluminide. The concentration of Ni in the diffusion zone will vary as it diffuses outward to form the NiAl. At a level below the original surface, the initial Ni composition of the substrate is maintained, but the Ni concentration in the diffusion zone will be less and will vary as a function of distance into the diffusion zone. The result is that although NiAl forms at the outer surface of the article, a gradient of varying composition of Ni and Al forms between the outer surface and the original substrate composition. The concentration gradients of Ni and other elements that diffuse outwardly from the substrate and the deposited aluminum, Al, create a diffusion zone between the outer surface of the article and that portion of the substrate having its original composition. Of course, exposure of the coated substrate to an oxidizing atmosphere typically results in the formation of an alumina layer over the nickel aluminide coating.

A platinum aluminide (PtAl) diffusion coating also may be formed by electroplating a thin layer of platinum over the nickel-base substrate to a predetermined thickness. Then, exposure of the platinum to an aluminum-rich environment at elevated temperatures causes the growth of an outer layer of PtAl as aluminum diffuses into and reacts with the platinum. At the same time, Ni diffuses outward from the substrate changing the composition of the substrate, while aluminum moves inward into and through the platinum into this diffusion zone of the substrate. Thus, complex structures of (Pt,Ni)Al are formed by exposing a substrate electroplated with a thin layer of Pt to an atmosphere rich in aluminum at elevated temperatures. As the aluminum diffuses inward toward the substrate and Ni diffuses in the opposite direction into the Pt creating the diffusion zone, PtAl$_2$ phases may precipitate out of solution so that the resulting Pt-NiAl intermetallic matrix may also contain the precipitates of PtAl$_2$ intermetallic. Precipitation of PtAl$_2$ occurs if Al levels above a certain level are achieved; below this level, the coating is considered single-phase (Pt,Ni)Al. As with the nickel aluminide coating, a gradient of aluminum occurs from the aluminum rich outer surface inward toward the substrate surface, and a gradient of Ni and other elements occurs as these elements diffuse outward from the substrate into the aluminum rich additive layer. Here, as in the prior example, an aluminum rich outer layer is formed at the outer surface, which may include both platinum aluminides and nickel aluminides, while a diffusion layer below the outer layer is created. As with the nickel aluminide coating, exposure of the coated substrate to an oxidizing atmosphere typically results in the formation of an outer layer of alumina. Suitable aluminide coatings also include the commercially available Codep aluminide coating, one form of which is described in U.S. Pat. No. 3,667,985, used alone or in combination with a first electroplate of platinum, among other suitable coatings.

The overall thickness of the diffusion coating may vary, but typically may not be greater than about 0.0045 inches (4.5 mils) and more typically may be about 0.002 inches–0.003 inches (2–3 mils) in thickness. The diffusion layer, which is grown into the substrate, typically may be about 0.0005–0.0015 inches (0.5–1.5 mils), more typically, about 0.001 inches (1 mil) thick, while the outer additive layer comprises the balance, usually about 0.001–0.002 inches (1–2 mils). For example, a new make component may have a diffusion bond coat of about 0.0024 inches (about 2.4 mils) in thickness, including an additive layer of about 0.0012 inches (1.2 mils) and a diffusion zone of about 0.0012 inches (about 1.2 mils).

The weight of the blade 10 with bond coat 20 may be represented by $w_0$. Ceramic thermal barrier coating 22 may then be applied over the bond coat 20. Ceramic thermal barrier coating 22 may comprise fully or partially stabilized yttria-stabilized zirconia and the like, as well as other low conductivity oxide coating materials known in the art. Examples of suitable ceramics include about 92–93 weight percent zirconia stabilized with about 7–8 weight percent yttria, among other known ceramic thermal barrier coatings. The ceramic thermal barrier coating 22 may be applied by any suitable means. One preferred method for deposition is by electron beam physical vapor deposition (EB-PVD), although plasma spray deposition processes also may be employed for combustor applications. The density of a suitable EB-PVD applied ceramic thermal barrier coating may be 4.7 g/cm$^3$, and more particular examples of suitable ceramic thermal barrier coatings are described in U.S. Pat. Nos. 4,055,705, 4,095,003, 4,328,285, 5,216,808 and 5,236,745 to name a few. The ceramic thermal barrier coating 22 may have a thickness (t) of between about 0.003 inches (3 mils) and about 0.010 inches (10 mils), more typically on the order of about 0.005 inches (5 mils) prior to engine service. This coating thickness should be considered nominal, as design and manufacturing may intentionally vary coating thickness around the component. The weight of the blade 10, including bond coat 20 and ceramic thermal barrier coating 22 may be represented by $w_1$.

The afore-described coated component, meeting the aerodynamic dimensions intended by design, when entered into service is thus exposed to high temperatures for extended periods of time. During this exposure, the bond coat 10 may grow through interdiffusion with the substrate alloy. The extent of the interdiffusion may depend on the diffusion couple (e.g. coating Al levels, coating thickness, substrate alloy composition (Ni- or Co-based)), and temperature and time of exposure.

In accordance with an aspect of the repair process of the present invention, the above coated blade 10, which has been removed from engine service may be first inspected to determine the amount of wear on the part, particularly with respect to any spallation of the outer ceramic thermal barrier coating 22. Inspection may be conducted by any means known in the art, including visual and flurosecent penetrant inspection, among others. If necessary, the tip may be conventionally repaired to restore part dimensions.

Next, if needed, the outer ceramic thermal barrier coating 22 may be removed from the blade 10, by means known in the art, including chemical stripping and/or mechanical processes. For example, the ceramic thermal barrier coating 22 may be removed by known methods employing caustic autoclave and/or grit blasting processes. The ceramic thermal barrier coating 22 also may be removed by the processes described in U.S. Pat. No. 6,544,346, among others. All patents and applications referenced herein are incorporated by reference.

After removal of the ceramic thermal barrier coating 22, cleaning processes may be employed as described above to remove residuals. The blade 10 may then be weighed using a conventional apparatus such as a scale or balance, and its weight denoted by $w_2$. The blade 10 also may be inspected at this stage, for example, by FPI techniques or other nondestructive techniques to further determine the integrity of the blade 10.

The underlying bond coat 20 may then be removed from blade 10 using methods known in the art. However, prior to removal of the above bond coat 20, if desired, conventional masking techniques may be employed to mask internal features of the blade 10 and protect any internal coating from removal. For example, a high temperature wax capable of withstanding the chemicals and temperatures employed in the bond coat removal step may be injected into the internal portion of the blade 10.

After any desired masking, mechanical processes such as the use of abrasive materials or chemical processes such as aqueous acid solutions, typically a mixture of nitric and phosphoric acids, may be employed to remove or strip off the underlying bond coat 20. In the case of metallic coatings based on aluminum, chemical etching wherein the article is submerged in an aqueous chemical etchant dissolving the coating as a result of reaction with the etchant may be employed. Accordingly, during the removal process about 1–3 mils of the interdiffused underlying base metal substrate may be removed thereby resulting in a decrease in airfoil wall thickness. The additive layer of the bond coat 20, typically about 1–2 mils (0.001–0.002 inches), also may be removed.

After complete coating removal of the ceramic thermal barrier coating 22 and underlying bond coat 20, any employed maskant also may be removed. High temperature exposure in vaccum or air furnaces, among other processes may be employed. The part may be conventionally cleaned to remove residuals. For example, water flushing may be employed, among other cleaning techniques. The blade 10, now having its previously applied thermal barrier coating system 18 removed, may then be weighed again. This new weight may be denoted by $w_3$. Accordingly, $w_3$ will be less than $w_2$. The difference, $w_2-w_3$, may thus represent the weight of removed bond coat 20 plus the weight of the underlying substrate removed during the stripping of the bond coat 20.

Welding/EDM and other processes also may be performed, as needed, to repair any defects in the underlying substrate, such as repair and reshaping of tip dimensions.

A new bond coat 21 may then be applied to the blade 10. Applicants have advantageously determined that if bond coat 20 is replaced with a NiAl overlay coating 21, further improved performance of the thermal barrier coating system may be realized. Bond coat 21 may comprise a NiAlCrZr overlay composition based on β-NiAl and reactive elements, including but not limited to Y, Zr and Hf, with Cr being optional in some instances. For example, bond coat 21 may contain about 30–60 atomic percent aluminum so as to be predominantly of the β-NiAl phase. Other suitable coatings for bond coat 21 include those described in commonly assigned U.S. Pat. Nos. 6,255,001, 6,153,313, 6,291,084, and U.S. application Ser. Nos. 10/029,320, 10/044,618 and 10/249,564.

Bond coat 21 may not be a traditional diffusion aluminide or MCrAlY coating, but instead may advantageously be a NiAl alloy consisting essentially of nickel and aluminum and containing zirconium in a very limited amount has been unexpectedly found to drastically increase the service life of a thermal barrier coating system. For example, zirconium additions of at least 0.2 atomic percent (e.g. 0.2 to about 0.5 atomic percent zirconium) have been shown to significantly improve the life of a thermal barrier coating system. Bond coat 21 thus may be a nickel aluminide bond coat containing zirconium, but otherwise predominantly of the β-NiAl phase, as described in U.S. Pat. No. 6,255,001.

Similarly, bond coat 21 may be predominantly of the β-NiAl phase with limited alloying additions of zirconium and chromium. For instance, bond coat 21 may also contain about 2–15 atomic percent chromium and about 0.1–1.2 atomic percent zirconium, for improved spallation resistance of a TBC deposited on the bond coat 21, as described in U.S. Pat. No. 6,291,084. Bond coat 21 also may contain alloying additions intended to increase creep strength and optionally contain alloying additions to increase fracture resistance and promote oxidation resistance. For instance, bond coat 21 may include additions of chromium, titanium, tantalum, silicon, hafnium and gallium, and optionally may contain additions of calcium, zirconium, yttrium and/or iron, as described in U.S. Pat. No. 6,153,313.

Bond coat 21 may be applied by, for example, using a PVD process such as magnetron sputter physical vapor deposition or electron beam physical vapor deposition. However, other deposition techniques also may be employed. Bond coat 21 also may be applied to any suitable thickness. For instance, an adequate thickness of the bond coat 21 may be between about 0.4 mils (0.0004 inches) to about 5 mils (0.005 mils), and may typically be applied to between about 1 mil (0.001 inches) and about 2 mils (0.002 inches). Bond coat 21 also may typically have a greater additive layer, such as between about 1.5–2 mils (0.0015–0.002 inches) in thickness than a previously removed diffusion bond coat 20, having an additive layer of about 1.2 mils (0.0012 inches).

Bond coat 21 may be deposited in such a manner as to minimize diffusion of the bond coat constituents into the base metal substrate. For instance, a diffusion zone of not more than 5 micrometers may be achieved by PVD techniques. This reduced level of interaction between the bond coat 21 and substrate promotes the formation of an initial layer of essentially pure aluminum oxide, promotes the slow growth of the protective aluminum oxide layer during service and reduces the formation of voluminous nonadherent oxides of substrate constituents. By limiting diffusion of the bond coat 21 into the substrate, minimal substrate material may be removed during refurbishment of the thermal barrier coating system, when both bond and ceramic layers of the coating system are removed to allow deposition of a new bond coat and ceramic layer on the substrate.

Applicants have determined through testing that the NiAl overlay bond coat 21 out-performs some MCrAlY or PtAl based coatings with higher TBC spallation lives and lower coating growth. Moreover, Applicants' NiAl overlay bond coat 21 may have a density of about 6.1 g/cm$^3$, which is lower than some PtAl diffusion coating having a density of about 7.9 g/cm$^3$. Accordingly, with the removal of the higher density bond coat 20 and replacement with a lower density NiAl overlay bond coat 21, further property improvements may be realized without a weight penalty in embodiments of the invention.

After application of the NiAl overlay bond coat 21, the blade 10 may be weighed again to determine the weight margin remaining. The weight of the part with the newly applied bond coat 21 may be denoted by $w_4$. Bond coat 21 advantageously grows considerably less than typical diffusion coatings in the application process and during engine operation exposure. Accordingly, downstream repairs will result in less base metal loss.

The weight/thickness margin remaining may be used to determine the thickness in which to apply the ceramic thermal barrier coating 22 in order to restore airfoil dimensions without suffering a weight penalty. In one embodiment, the measurement of the original base metal thickness may be employed. This thickness may be physically measured using techniques known in the art, prior to application of any coatings. For example, nondestructive means such as ultrasound, x-ray analysis and CAT scan devices may be employed, among others. The original base metal thickness also may be known from design specifications of the component. Similarly, the thickness of the base metal after removal of the bond coat may be measured. The base metal thickness loss, Δt, as a result of bond coat removal, may be determined by comparing the original base metal thickness of the component to the measured thickness of the base metal after removal of the bond coat. The difference in measured thickness represents Δt.

Similarly, after bond coat stripping, the part's outer dimensions may be measured using co-ordinate measuring machines (CMM) or light gages. The three dimensional information from the engine exposed part may be compared to the original design intent. The average difference in dimensions may be used as Δt.

Alternatively, using combinations of the weight measurements $w_0$, $w_1$, $w_2$, $w_3$, $w_4$, the amount of removed base metal may be determined. For example, $w_2-w_3$ may be used to determine the weight of the removed base metal. The weight difference between $w_2-w_3$ may be modified by, for instance, subtracting the expected weight of the previously applied diffusion coating additive layer having a thickness $X_{add}$. If unknown, the value may be approximated to be about 1.2 mils. The density (ρ) of this layer may be about 6.1 g/cm$^3$ for a simple aluminide or about 7.9 g/cm$^3$ for a PtAl additive layer. The weight of the additive layer removed may be calculated by: $w_{Add}=(x_{add})(area)(\rho)$ wherein area is the component surface are being stripped of additive layer. $W_{add}$ may then be subtracted from $w_2-w_3$ (or $w_2-w_3-w_{add}$) to obtain the weight of removed Ni-base superalloy. The thickness of superalloy removed may be determined using various known values: $\Delta t=(w_2-w_3-w_{add})/(area \times \rho_{superalloy})$ The density of the removed base metal material ($\rho_{superalloy}$) varies depending upon the particular alloy employed. However, the density of the superalloy will typically be greater than that of the ceramic layer. Accordingly, the mass change may be correlated to the area of stripped bond coating and density of the base metal. The base metal thickness loss, Δt, is thus related to the base metal alloy density and stripped area, which are known values. The thickness, Δt, may be determined by: Δt=(weight removed)/(area×density).

Once determined, the base metal thickness loss, Δt, may be added to the original ceramic thermal barrier coating thickness, t, where Δt also represents the additional thickness of the ceramic added to compensate for the base metal loss of the substrate as a result of the above bond coat removal/stripping procedures. For example, the value of Δt may be between about 1 mil (0.001 inches) and about 3 mils (0.003 inches), and more typically at least about 2 mils (0.002 inches).

The difference in thickness, Δx, between the prior bond coat 20 thickness and new bond coat 21 also may be determined. This difference, Δx, may be determined by, for example, knowing the actual value for $x_{NiAl}$ and known value of $x_{add}$ and determining the difference between them (e.g., $\Delta x=x_{NiAl}-X_{add}$). If unknown, $x_{add}$ may be approximated at about 1.2 mil. The ceramic thermal barrier coating 22 may then be applied at the newly determined nominal thickness of t+Δt−Δx. If, for instance, $x_{NiAl}>x_{add}$, the preferred TBC thickness will be less than t+Δt, and if $x_{NiAl} \geq x_{add}$, the final intended TBC thickness will be more than t+Δt.

In accordance with one embodiment of the invention, for example, thicknesses of about 1 mil (0.001 inches) of a higher density PtAl diffusion bond coat 20 and about 3 mils (0.003 inches) of an underlying Ni-based alloy (8.64 g/cm$^3$) may be removed during the repair process. A NiAl overlay bond coat 21 having a thickness of about 1–2 mils (0.001–0.002 inches) may be applied plus about 2–3 mils (0.002–0.003 inches) of additional ceramic thermal barrier coating 22 or other suitable ceramic material without a weight penalty and while restoring the coated aerodynamic dimensions.

The coating 22 or other suitable ceramic thermal barrier coating may be applied to the newly determined thickness using conventional methods, and one skilled in the art would understand how to adjust the coating process/time to achieve the new thickness. For example, a new targeted part weight gain may be established based on the new thickness using regression curves. The TBC producer may accomplish the new weight gain by adding time to the coating operation in a prescribed way. To establish regression curves, for example, numerous parts may be coated with the ceramic thermal barrier coating and weight measurements taken at various coating thicknesses to determine that for a particular resultant weight gain, a particular ceramic thermal barrier coating thickness will need to be applied. Thus, if a particular predetermined thermal barrier coating thickness is desired, the coating may be applied to the targeted weight gain. The coating time may be adjusted to achieve the desired weight gain.

Figure 3:
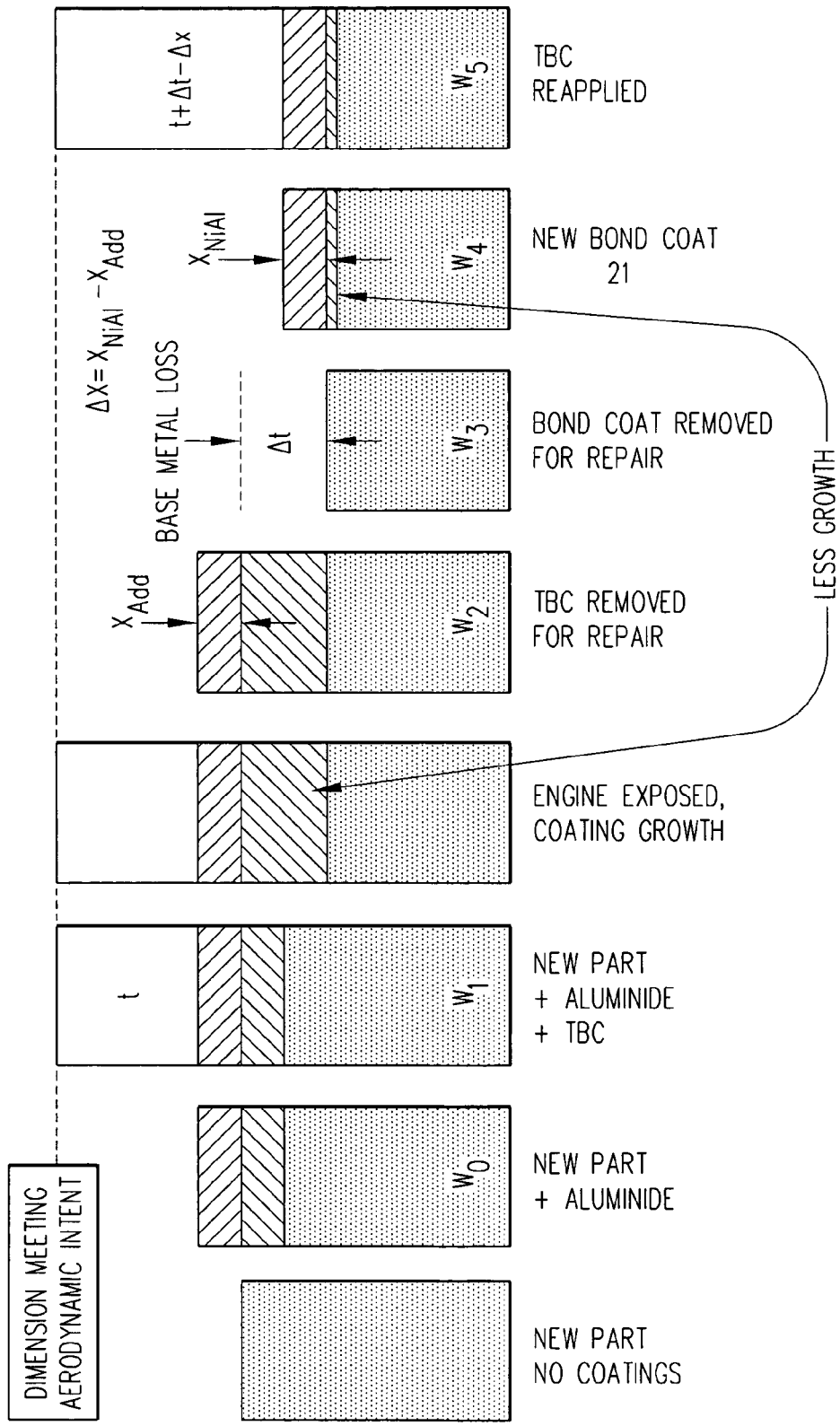
FIG. 3 is a flow chart showing an embodiment of the process of the invention.

The recoated blade may be weighed, and this weight may be represented by $w_5$. $W_5$ will be less than $w_1$ because of the added ceramic, which has a lower density than that of the removed base metal. Advantageously, this newly coated component employing overlay bond coat 21 has the restored dimensions to meet the original aerodynamic intent of the part, as shown schematically in the process example set forth in FIG. 3, and does not suffer a weight penalty.

Applicants have advantageously determined how to increase the engine efficiency in contrast to the teachings of prior repair techniques. In particular, Applicants have determined how to increase engine efficiency by, for example, correlating the above weight measurements with that of the outer ceramic thermal barrier coating 22 to determine effective new thicknesses for application of the outer ceramic material. This process is surprising and in contrast to prior teachings.

The afore-described process also is applicable to repair and refurbish components more than once. In this case, care should be taken to measure and ensure that the thickness of the remaining base metal meets any minimum thickness design requirements.

While various embodiments are described herein it will be appreciated from the specification that various combinations of elements, variations or improvements therein may be made by those skilled in the art, and are within the scope of the invention.

What is claimed is:

1. A method for restoring adjacent airfoil to airfoil throat distance of a coated component, which has been exposed to engine operation, to restore coated dimensions of the component and increase subsequent engine operation efficiency, comprising the sequential steps of:
   a) providing an engine run component including a base metal substrate having thereon a thermal barrier coating system, the thermal barrier coating system comprising a bond coat on the base metal substrate and a top ceramic thermal barrier coating, the top ceramic thermal barrier coating having a nominal thickness t; wherein the component including the bond coat thereon before engine operation has a weight, $w_0$, and the component including the bond coat and the top thermal barrier coating thereon before engine operation has a weight, $w_1$;
   b) removing completely the thermal barrier coating system, wherein a portion of the base metal substrate also is removed, and determining thickness of the base metal substrate removed, the portion of the base metal substrate removed having a thickness, $\Delta t$; wherein the component has a weight, $w_2$, after removal of the thermal barrier coating and before removal of the bond coat; and the component has a weight, $w_3$, after complete removal of the thermal barrier coating system;
   c) applying a β phase NiAl overlay coating to the substrate, and determining the difference in thickness, $\Delta x$, between the β phase NiAl overlay coating and the bond coat previously removed; wherein after application of the NiAl overlay coating the component is weighed, denoted by $w_4$, to determine a weight margin remaining, wherein a combination of at least two of $w_0$, $w_1$, $w_2$, $w_3$ and $w_4$ is employed to determine amount of removed base metal and calculate a thickness in which to apply a top ceramic thermal barrier coating without incurring a weight penalty;
   d) reapplying a top ceramic thermal barrier coating to a nominal thickness of $t+\Delta t-\Delta x$, wherein $\Delta t$ compensates for the portion of base metal substrate removed in b) to restore adjacent airfoil to airfoil throat distance to about the distance preceding the engine run so that the dimensions of the coated component are restored to about the coated dimensions preceding the engine run to increase subsequent engine operation efficiency without a weight penalty, wherein the thermal barrier coating of d) is applied at a thickness greater than the thermal barrier coating of a); and weight of the component having the bond coat of c) and the thermal barrier coating of d) thereon is denoted by $w_5$, wherein $w_5$ is less than $w_1$.

2. The method of claim 1, wherein the engine run component is a high pressure turbine blade, and coated airfoil contour dimensions of the coated component are restored.

3. The method of claim 1, wherein t is between about 3 mils and about 10 mils, and $\Delta t$ is at least about 0.5 mil.

4. The method of claim 1, wherein the bond coat of a) comprises a diffusion aluminide coating.

5. The method of claim 4, wherein the diffusion aluminide coating is a simple aluminide or a modified aluminide.

6. The method of claim 4, wherein the diffusion aluminide coating is a modified aluminide coating comprising a metal selected from the group consisting of Pt, Rh and Pd.

7. The method of claim 4, wherein the diffusion aluminide coating further comprising reactive elements.

8. The method of claim 1, wherein the base metal substrate is a nickel-based single crystal superalloy.

9. The method of claim 1, wherein the base metal substrate is a nickel-based directionally solidified superalloy.

10. The method of claim 1, wherein the ceramic thermal barrier coating comprising yttria stabilized with zirconia.

11. The method of claim 1, wherein the bond coat of a) comprises a MCrAlY coating.

12. The method of claim 1, wherein the β NiAl overlay coating comprises a NiAl alloy consisting essentially of nickel and aluminum and containing zirconium.

13. The method of claim 1, wherein the β NiAl overlay coating is applied to a thickness of about 0.5–2 mils.

14. The method of claim 12, wherein the alloy comprises at least about 0.2 atomic percent of the zirconium.

15. The method of claim 1, wherein the β NiAl overlay coating comprises about 2–15 atomic percent chromium and about 0.1–1.2 atomic percent zirconium.

16. The method of claim 1, wherein the β NiAl overlay coating further comprises reactive elements.

17. The method of claim 16, wherein the reactive elements are selected from the group consisting of Hf, Zr and Y.

18. The method of claim 1, wherein the component is an airfoil.

19. The method of claim 1, wherein the component is a static component.

20. The method of claim 19, wherein the static component is a vane.

21. The method of claim 1, wherein $w_2-w_3$ is employed to determine weight of the removed base metal; and the base metal thickness loss, $\Delta t$, is determined by: $\Delta t$=(weight of removed base metal)/(stripped area×density of base metal).

22. A method for restoring adjacent airfoil to airfoil throat distance of a coated high pressure turbine blade, which has been exposed to engine operation, to restore airfoil contour dimensions of the blade comprising the sequential steps of:
   a) providing an engine run high pressure turbine blade including a base metal substrate made of a nickel-based alloy having thereon a thermal barrier coating system, the thermal barrier coating system comprising a diffusion bond coat on the base metal substrate and a top ceramic thermal barrier coating comprising a yttria stabilized zirconia material, the top ceramic thermal barrier coating having a nominal thickness t; wherein the component including the bond coat thereon before engine operation has a weight, $w_0$, and the component including the bond coat and the top thermal barrier coating thereon before engine operation has a weight, $w_1$;
   b) removing completely the thermal barrier coating system, wherein a portion of the base metal substrate also is removed, and determining thickness of the base metal substrate removed, the portion of the base metal substrate removed having a thickness, $\Delta t$; wherein the component has a weight, $w_2$, after removal of the thermal barrier coating and before removal of the bond coat; and the component has a weight, $w_3$, after complete removal of the thermal barrier coating system;
   c) applying a β phase NiAl overlay coating to the substrate, and determining the difference in thickness, $\Delta x$, between the β phase NiAl overlay coating and the previously removed bond coat, wherein after application of the NiAl overlay coating the component is weighed, denoted by $w_4$, to determine a weight margin remaining, wherein a combination of at least two of $w_0$, $w_1$, $w_2$, $w_3$ and $w_4$ is employed to determine amount of removed base metal and calculate a thickness in which to apply a top ceramic thermal barrier coating without incurring a weight penalty;
   d) reapplying the top ceramic thermal barrier coating to a nominal thickness of $t+\Delta t-\Delta x$, wherein $\Delta t$ compensates for the portion of base metal substrate removed in b) to restore adjacent airfoil to airfoil throat distance to about the distance preceding the engine run so that the coated airfoil contour dimensions of the coated blade are restored to about the coated dimensions preceding the engine run without a weight penalty, wherein the thermal barrier coating of d) is applied at a thickness greater than the thermal barrier coating of a); and weight of the component having the bond coat of c) and the thermal barrier coating of d) thereon is denoted by $w_5$, wherein $w_5$ is less than $w_1$.

23. The method of claim 22, wherein the nickel-based alloy has a density of about 8.64 g/cm³.

24. The method of claim 22, wherein the yttria stabilized zirconia material has a density of about 4.7 g/cm³.

25. A method for restoring adjacent airfoil to airfoil throat distance of a coated component, which has been exposed to engine operation, to restore coated airfoil contour dimensions of the component consisting essentially of the sequential steps of:
   a) providing an engine run component including a base metal substrate made of a nickel-based alloy having thereon a thermal barrier coating system, the thermal barrier coating system comprising a diffusion bond coat on the base metal substrate and a top ceramic thermal barrier coating comprising a yttria stabilized zirconia material, the top ceramic thermal barrier coating having a nominal thickness t; wherein the component including the bond coat thereon before engine operation has a weight, $w_0$, and the component including the bond coat and the top thermal barrier coating thereon before engine operation has a weight $w_1$;
   b) inspecting the component;
   c) removing completely the thermal barrier coating system by stripping, wherein a portion of the base metal substrate also is removed, the portion of the base metal substrate removed having a thickness, $\Delta t$; wherein the component has a weight, $w_2$, after removal of the thermal barrier coating and before removal of the bond coat; and the component has a weight, $w_3$, after complete removal of the thermal barrier coating system;
   d) applying a β phase NiAl overlay coating to the substrate and determining the difference in thickness $\Delta x$ between the β phase NiAl overlay coating and the previously removed bond coat; and weighing the component to calculate $\Delta t$; wherein after application of the NiAl overlay coating the component is weighed, denoted by $w_4$, to determine a weight margin remaining, wherein a combination of at least two of $w_0$, $w_1$, $w_2$, $w_3$ and $w_4$ is employed to determine amount of removed base metal and calculate a thickness in which to apply a top ceramic thermal barrier coating without incurring a weight penalty;
   e) reapplying the top ceramic thermal barrier coating to a nominal thickness of $t+\Delta t-\Delta x$, wherein $\Delta t$ compensates for the portion of base metal substrate removed in c) to restore adjacent airfoil to airfoil throat distance to about the distance preceding the engine run so that the airfoil contour dimensions of the coated component are restored to about the coated dimensions preceding the engine run without a weight penalty, wherein the thermal barrier coating of d) is applied at a thickness greater than the thermal barrier coating of a); and weight of the component having the bond coat of c) and the thermal barrier coating of d) thereon is denoted by $w_5$, wherein $w_5$ is less than $W_1$.

* * * * *